(12) United States Patent
Trewhella et al.

(10) Patent No.: US 11,787,468 B2
(45) Date of Patent: Oct. 17, 2023

(54) SYSTEMS AND METHODS FOR VEHICLE INGRESS OR EGRESS ASSIST

(71) Applicant: STEERING SOLUTIONS IP HOLDING CORPORATION, Saginaw, MI (US)

(72) Inventors: Nicholas M. Trewhella, Sanford, MI (US); Scott T. Knaub, Bay City, MI (US); Jingyu Zhu, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 348 days.

(21) Appl. No.: 17/245,013

(22) Filed: Apr. 30, 2021

(65) Prior Publication Data

US 2021/0354751 A1 Nov. 18, 2021

Related U.S. Application Data

(60) Provisional application No. 63/025,958, filed on May 15, 2020.

(51) Int. Cl.
*B62D 6/00* (2006.01)
*B62D 15/02* (2006.01)
(Continued)

(52) U.S. Cl.
CPC ............... *B62D 6/008* (2013.01); *B60N 2/90* (2018.02); *B62D 1/04* (2013.01); *B62D 15/02* (2013.01)

(58) Field of Classification Search
CPC .......... B62D 6/008; B62D 1/04; B62D 15/02; B62D 5/006; B62D 6/00; B60N 2/90; B60N 2/002
(Continued)

(56) References Cited

U.S. PATENT DOCUMENTS 4,761,645 A * 8/1988 Mochida ............ G07C 9/00309
340/426.36
2006/0195238 A1* 8/2006 Gibson ................ G05D 1/0061
701/23
(Continued)

FOREIGN PATENT DOCUMENTS

CN 201371851 Y 12/2009
CN 102069850 A 5/2011
(Continued)

OTHER PUBLICATIONS

First Chinese Office Action and Search Report received from the Chinese Patent Office for related Chinese Patent Application No. 202110534112.5 dated Dec. 15, 2022, 6 pages.

*Primary Examiner* — Shardul D Patel
(74) *Attorney, Agent, or Firm* — Dickinson Wright PLLC

(57) ABSTRACT

A method includes, in response to an entry signal indicating an opening of an operator door, detecting a first torque value corresponding to a first torque applied to a handwheel and determining a second torque value corresponding to the first torque value. The method also includes applying, to the handwheel, a second torque corresponding to the second torque value and, based on at least one of a measurement associated with a seat sensor and a period associated with the first torque being applied to the handwheel: determining whether to selectively adjust the second torque value; and, in response to a determination to selectively adjust the second torque value, applying, to the handwheel, an adjusted torque corresponding to the adjusted second torque value.

20 Claims, 5 Drawing Sheets

(51) Int. Cl.
*B60N 2/90* (2018.01)
*B62D 1/04* (2006.01)

(58) Field of Classification Search
USPC .......................................................... 701/41
See application file for complete search history.

(56) References Cited

U.S. PATENT DOCUMENTS

2006/0225973 A1* 10/2006 Dimig ................... E05C 19/166
    188/161
2012/0303191 A1* 11/2012 McGrogan ............ B60W 10/02
    701/68
2019/0375447 A1* 12/2019 Zuzelski .................. B62D 1/00

FOREIGN PATENT DOCUMENTS

| CN | 103407483 A | 11/2013 |
| EP | 2388161 A1 | 11/2011 |
| EP | 3092897 A1 | 11/2016 |
| WO | 2008037313 A1 | 4/2008 |

\* cited by examiner

SYSTEMS AND METHODS FOR VEHICLE INGRESS OR EGRESS ASSIST

CROSS-REFERENCES TO RELATED APPLICATIONS

This patent application claims priority to U.S. Provisional Patent Application Ser. No. 63/025,958, filed May 15, 2020, which is incorporated herein by reference in its entirety.

TECHNICAL FIELD

This disclosure relates to vehicles and in particular to systems and methods for vehicle ingress or egress assist.

BACKGROUND

Vehicles, such as cars, trucks, sport utility vehicles, crossovers, mini-vans, marine craft, aircraft, all-terrain vehicles, recreational vehicles, or other suitable vehicles, typically include a steering system, such as an electronic power steering system (e.g., comprising a steer-by-wire system or other electronic power steering system) or other suitable steering system. The steering system may include a handwheel that is not mechanically connected to the vehicle wheels, and instead utilizes various motors and electrical signals to control steering of the vehicle wheels based on input signals received from the handwheel.

Increasingly, there is a demand for vehicles having a high center of gravity (e.g., trucks, sport utility vehicles, and the like), which typically have relatively high ground clearance and, accordingly, may require additional effort to enter and exit. Typically, an operator of such a vehicle may use the handwheel of the vehicle as a means to aid in entering and/or exiting the vehicle.

SUMMARY

This disclosure relates generally to vehicle ingress or egress assist.

An aspect of the disclosed embodiments includes a system for ingress or egress assist. The system includes a processor and a memory. The memory incudes instructions that, when executed by the processor, cause the processor to: receive an entry signal; identify a handwheel torque value corresponding to a torque applied on a handwheel; determine whether the entry signal indicates a vehicle entry; and in response to a determination that the entry signal indicates a vehicle entry: determine a counter torque value corresponding to the handwheel torque value; apply torque to the handwheel based on the counter torque value; in response to the torque corresponding to the handwheel torque value being applied to the handwheel for a predetermined period, selectively adjust the counter torque value; and apply torque to the handwheel based on the adjusted counter torque value.

Another aspect of the disclosed embodiments includes a method for providing ingress or egress assist. The method includes receiving an entry signal and identifying a handwheel torque value corresponding to a torque applied on a handwheel. The method also includes determining whether the entry signal indicates a vehicle entry and in response to a determination that the entry signal indicates a vehicle entry: determining a counter torque value corresponding to the handwheel torque value; applying torque to the handwheel based on the counter torque value; in response to the torque corresponding to the handwheel torque value being applied to the handwheel for a predetermined period, selectively adjusting the counter torque value; and applying torque to the handwheel based on the adjusted counter torque value.

Another aspect of the disclosed embodiments includes a system for providing ingress or egress assist. The system includes a processor and a memory. The memory includes instructions that, when executed by the processor, cause the processor to: in response to an entry signal indicating an opening of an operator door, detect a first torque value corresponding to a first torque applied to a handwheel; determine a second torque value corresponding to the first torque value; apply, to the handwheel, a second torque corresponding to the second torque value; and, based on at least one of a measurement associated with a seat sensor and a period associated with the first torque being applied to the handwheel: determine whether to selectively adjust the second torque value; and, in response to a determination to selectively adjust the second torque value, apply, to the handwheel, an adjusted torque corresponding to the adjusted second torque value.

Another aspect of the disclosed embodiments includes a method for providing ingress or egress assist. The method includes, in response to an entry signal indicating an opening of an operator door, detecting a first torque value corresponding to a first torque applied to a handwheel and determining a second torque value corresponding to the first torque value. The method also includes applying, to the handwheel, a second torque corresponding to the second torque value and, based on at least one of a measurement associated with a seat sensor and a period associated with the first torque being applied to the handwheel: determining whether to selectively adjust the second torque value; and, in response to a determination to selectively adjust the second torque value, applying, to the handwheel, an adjusted torque corresponding to the adjusted second torque value.

Another aspect of the disclosed embodiments includes an apparatus for providing ingress or egress assist. The apparatus includes a processor and a memory. The memory includes instructions that, when executed by the processor, cause the processor to: in response to an entry signal indicating an opening of an operator door, detect a first torque value corresponding to a first torque applied to a handwheel; determine a second torque value corresponding to the first torque value; apply, to the handwheel, a second torque corresponding to the second torque value; and, based on at least the first torque being applied to the handwheel for a predefined period: adjust the second torque value; and apply, to the handwheel, an adjusted torque corresponding to the adjusted second torque value.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
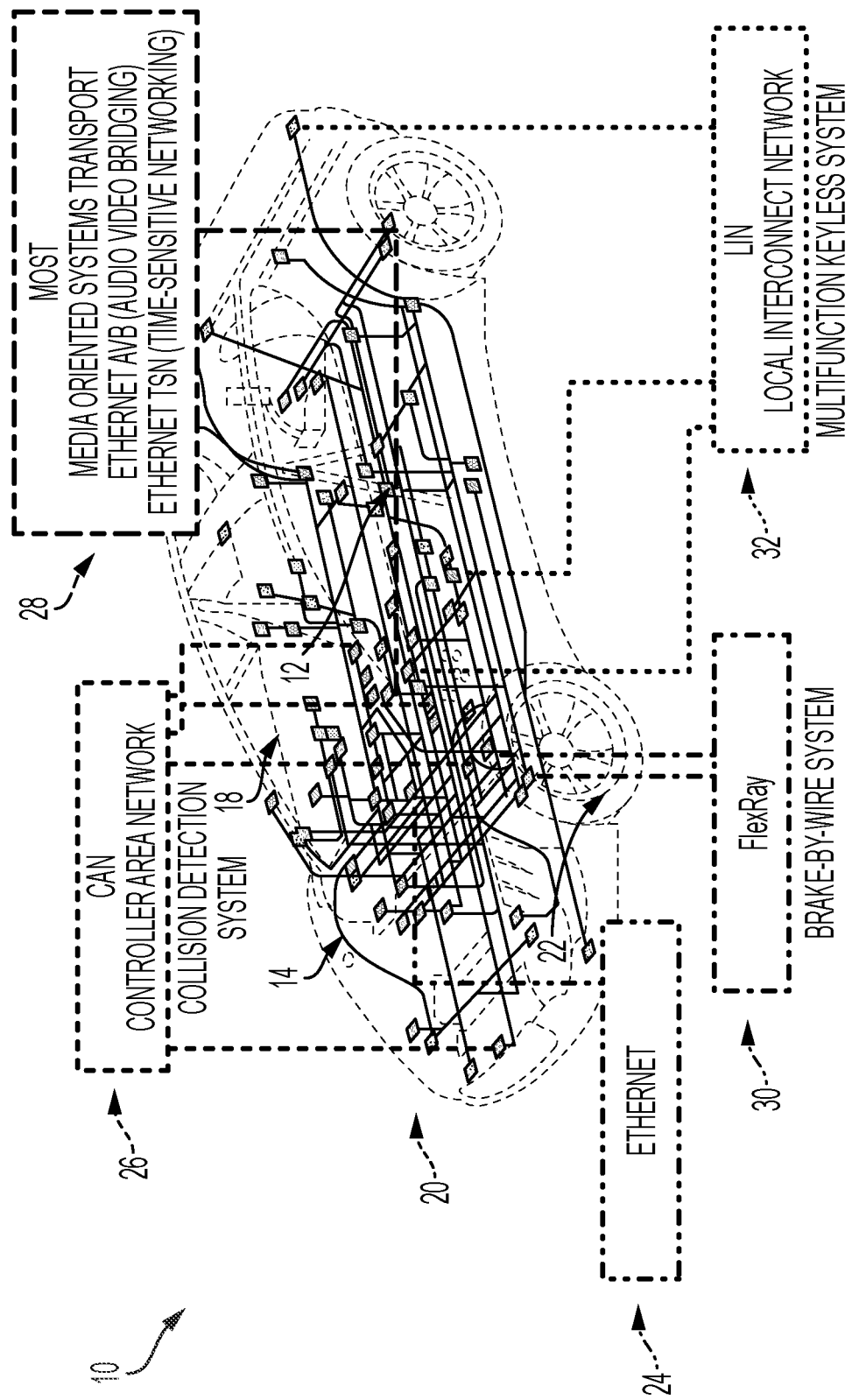
FIG. 1 generally illustrates a vehicle according to the principles of the present disclosure.

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Vehicles, such as cars, trucks, sport utility vehicles, crossovers, mini-vans, marine craft, aircraft, all-terrain vehicles, recreational vehicles, or other suitable vehicles, typically include a steering system, such as an electronic power steering system (e.g., comprising a steer-by-wire system or other electronic power steering system) or other suitable steering system. The steering system may include a handwheel that is not mechanically connected to the vehicle wheels, and instead utilizes various motors and electrical signals to control steering of the vehicle wheels based on input signals received from the handwheel.

Increasingly, there is a demand for vehicles having a high center of gravity (e.g., trucks, sport utility vehicles, and the like). For example, operators are migrating to relatively higher riding vehicles to help improve vision of the road and/or in traffic. However, such vehicles may be difficult to enter, particularly for operators of such vehicles having mobility issues (e.g., elderly operators, operators with conditions affecting mobility, and the like).

Typically, an operator of such a vehicle may use the handwheel of the vehicle as a means to aid in entering and/or exiting the vehicle. In vehicles that include a handwheel mechanically connected to the steering system, in the event that the vehicle is not running, a column lock may engage, which may hold, the handwheel stationary. This resistance to movement allows the operator to use the handwheel to enter or exit the vehicle. However, in a steering system that includes a steer-by-wire system, no such column lock is present to hold the handwheel in stationary. Challenges with vehicle ingress and/or egress may prevent such operators from purchasing such high center of gravity vehicles having steer-by-wire systems.

Accordingly, systems and methods, such as those described herein, configured to provide vehicle ingress and/or egress lift assist, may be desirable. In some embodiments, the systems and methods described herein may be configured to hold the position of the handwheel actuator as a means to use the handwheel ingress and/or egress device. The systems and methods described herein may be configured to, after a period, provide ingress assist to the operator.

In some embodiments, the systems and methods described herein may be configured to, in response to the operator applying a torque on handwheel (e.g., which applies a torque on the steering system), provide a counter torque (e.g., using the handwheel actuator or other suitable components of the steering system) that resists motion of the handwheel in the direction of the torque applied by the operator.

In some embodiments, the systems and methods described herein may be configured to, in response to determining that the operator has applied the torque on the handwheel for a predetermined period (e.g., indicating that the operator is having difficulty entering the vehicle), increase the counter torque, which may assist (e.g., or lift) the operator into the vehicle. It should be understood that the systems and methods described herein may be applied to any suitable application, including vehicles having relatively high ingress and/or egress locations (e.g., mid to heavy duty vehicles), vehicle having a relatively low ingress and/or egress locations, or other suitable applications.

In some embodiments, the systems and methods described herein may be configured to provide the greater counter torque in response to a controller of the vehicle waking up, which may be detected over a suitable vehicle network (e.g., via a door opening), such as those described herein or other suitable network. The systems and methods described herein may be inactive during vehicle shutdown (e.g., exit from the vehicle).

In some embodiments, the systems and methods may determine whether a vehicle key is within a predetermined distance from the vehicle. The systems and methods described herein may be configured to provide entry assist based on a determination that the vehicle key is within the predetermined distance of the vehicle.

In some embodiments, the systems and methods described herein may be configured to determine whether a vehicle door was properly opened. The systems and methods described herein may be configured to may determine to provide entry assist based on a determination that the door was properly opened.

In some embodiments, the systems and methods described herein may be configured to interact with a voice command system. The systems and methods described herein may be configured to receive a voice command from the operator indicating a desire to enter the vehicle. The systems and methods described herein may be configured to provide ingress and/or egress assist based on the voice command.

In some embodiments, the systems and methods described herein may communicate with a steer-by-wire system. The systems and methods described herein may be configured to use the steer-by-wire system to provide ingress and/or egress assist.

In some embodiments, the systems and methods described herein may be configured to monitor ingress and/or egress function of the vehicle. The systems and methods described herein may be configured to apply a torque to the handwheel actuator to hold position of the handwheel (e.g., similar to that of a column lock), which may allow the use of the handwheel for ingress and/or egress of the vehicle. The systems and methods described herein may be configured to control position of the handwheel to provide assistance to the operator during ingress of the vehicle and/or the guide the operator to a seat in the vehicle.

In some embodiments, the systems and methods described herein may be configured to receive an entry signal. The systems and methods described herein may be configured to identify a handwheel torque value corresponding to a torque applied on a handwheel. The systems and methods described herein may be configured to determine whether the entry signal indicates a vehicle entry. The systems and methods described herein may be configured to, in response to a determination that the entry signal indicates a vehicle entry: determine a counter torque value corresponding to the handwheel torque value; apply torque to the handwheel based on the counter torque value; in response to the torque corresponding to the handwheel torque value being applied to the handwheel for a predetermined period, selectively adjust the counter torque value; and apply torque to the handwheel based on the adjusted counter torque value.

In some embodiments, the systems and methods described herein may be configured to in response to an entry signal indicating an opening of an operator door, detect a first torque value corresponding to a first torque applied to a handwheel. The systems and methods described herein may be configured to determine a second torque value corresponding to the first torque value. In some embodiments, an absolute value of the second torque value is equal to an absolute value of the first torque value. In some embodiments, the second torque value is applied in a direction opposite of the first torque value.

The systems and methods described herein may be configured to apply, to the handwheel, a second torque corresponding to the second torque value. The systems and methods described herein may be configured to, based on at least one of a measurement associated with a seat sensor and a period associated with the first torque being applied to the handwheel, determine whether to selectively adjust the second torque value and, in response to a determination to selectively adjust the second torque value, apply, to the handwheel, an adjusted torque corresponding to the adjusted second torque value. In some embodiments, the systems and methods described herein may be configured to adjust the second torque value by increasing the second torque value based on an absolute value of the first torque value.

In some embodiments, the systems and methods described herein may be configured to determine to selectively adjust the second torque value in response to the measurement associated with the seat sensor being less than a seat sensor threshold and the period associated with the first torque being applied to the handwheel being greater than a period threshold.

In some embodiments, the systems and methods described herein may be configured to determine to selectively adjust the second torque value in response to the measurement associated with the seat sensor being greater than the seat sensor threshold and the period associated with the first torque being applied to the handwheel being less than the period threshold.

In some embodiments, the systems and methods described herein may be configured to determine to selectively adjust the second torque value in response to the measurement associated with the seat sensor being greater than the seat sensor threshold and the period associated with the first torque being applied to the handwheel being greater than the period threshold.

In some embodiments, the systems and methods described herein may be configured to receive an ignition signal. The systems and methods described herein may be configured to, in response to the ignition signal indicating a status of an ignition has changed from an on position to an off position and in response to the entry signal indicating an opening of the operator door, detect a third torque value corresponding to a third torque being applied to the handwheel. The systems and methods described herein may be configured to determine a fourth torque value corresponding to the third torque value. The systems and methods described herein may be configured to apply, to the handwheel, a fourth torque corresponding to the fourth torque value.

In some embodiments, the systems and methods described herein may be configured to determine to selectively adjust the fourth torque value in response to the measurement associated with the seat sensor being greater than the seat sensor threshold and a period associated with the third torque being applied to the handwheel being greater than the period threshold. The systems and methods described herein may be configured to apply, to the handwheel, an adjusted torque value corresponding to the adjusted fourth torque value.

FIG. 1 generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles.

The vehicle 10 includes a vehicle body 12 and a hood 14. A passenger compartment 18 is at least partially defined by the vehicle body 12. Another portion of the vehicle body 12 defines an engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position. In some embodiments, the engine compartment 20 may be disposed on rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a steering wheel (e.g., or handwheel), and other such components are disposed in the passenger compartment 18 of the vehicle 10. The propulsion controls may be actuated or controlled by a driver of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system. As such, in some embodiments, the vehicle 10 may be an autonomous vehicle.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or fuel cell provides energy to the electric motors to turn the wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle.

The vehicle 10 may include a steering system, such as an electronic power steering (EPS) system. The EPS system may be configured to provide a steering assist to an operator of a corresponding vehicle. For example, the EPS system may be configured to apply an assist torque to an electric motor, which is connected to a steering mechanism, such as the handwheel. As the operator interacts with the handwheel, the amount of force or torque applied by the operator on the handwheel is assisted (e.g., reducing amount of force or torque required by the operator to perform a corresponding steering maneuver) by the electric motor.

Typically, the EPS system communicates with one or more sensors configured to measure various aspects of the vehicle. The EPS system may communicate with the one or more sensors using a vehicle communication system, such as a communication bus. The EPS system may communicate with the one or more sensors using the vehicle communication system to receive the various measurements from the one or more sensors. The EPS system may include a controller configured to determine the assist torque based on the various measurements. The controller may then provide the assist torque to the electric motor to provide the steering assist to the operator of the vehicle.

In some embodiments, the steering system may include a magnetic torque overlay (MTO) system The MTO system may include one or more gears and one or more integrated electromagnetic actuators. The MTO system may include pressure sensor hardware and a controller. The MTO may be configured to control increasing and/or decreasing torque applied to the steering system.

In some embodiments, the vehicle 10 may include an Ethernet component 24, a controller area network (CAN) bus 26, a media oriented systems transport component (MOST) 28, a FlexRay component 30 (e.g., brake-by-wire system, and the like), and a local interconnect network component (LIN) 32. The vehicle 10 may use the CAN bus 26, the MOST 28, the FlexRay Component 30, the LIN 32, other suitable networks or communication systems, or a combination thereof to communicate various information from, for example, sensors within or external to the vehicle, to, for example, various processors or controllers within or external to the vehicle. The vehicle 10 may include additional or fewer features than those generally illustrated and/or disclosed herein.

Figure 2:
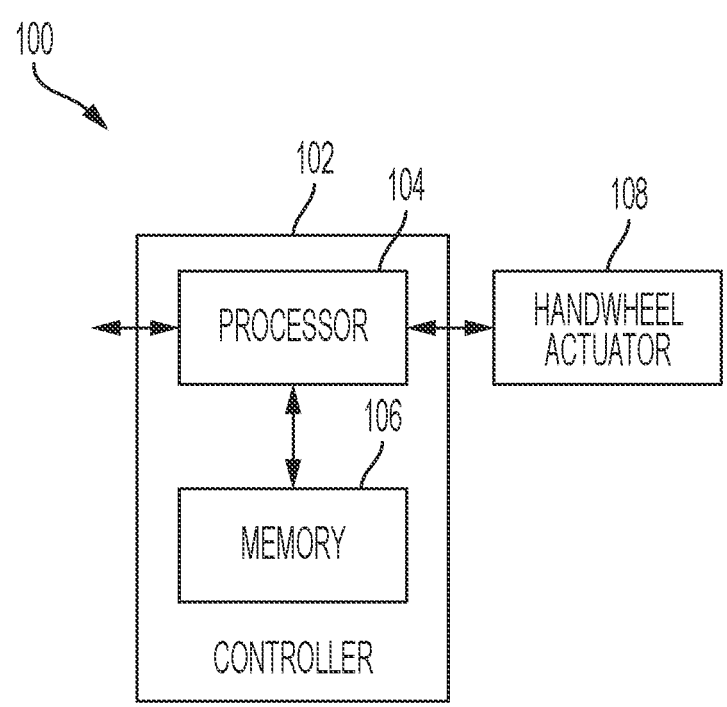
FIG. 2 generally illustrates a lift assist system according to the principles of the present disclosure.

FIG. 2 generally illustrates a block diagram ingress or egress assist system 100 according to the principles of the present disclosure. The system 100 may include controller 102. The controller 102 may include a processor 104 and a memory 106. The processor 104 may include any suitable processor, such as those described herein. Additionally, or alternatively, the controller 102 may include any suitable number of processors, in addition to or other than the processor 104. The memory 106 may comprise a single disk or a plurality of disks (e.g., hard drives), and includes a storage management module that manages one or more partitions within the memory 106. In some embodiments, memory 106 may include flash memory, semiconductor (solid state) memory or the like. The memory 106 may include Random Access Memory (RAM), a Read-Only Memory (ROM), or a combination thereof. The memory 106 may include instructions that, when executed by the processor 104, cause the processor 104 to, at least, provide ingress and/or egress assist to an operator of the vehicle 10.

In some embodiment, the system 100 includes a handwheel actuator 108. The handwheel actuator 108 may include any suitable actuator and may comprise one or more actuators. The handwheel actuator 108 may be configured to apply torque to the handwheel of the vehicle 10. The handwheel actuator 108 may include or be in communication with one or more sensors configured to sense an amount of torque applied by to the handwheel of the vehicle 10 by the operator and/or to sense an amount of torque applied handwheel actuator 108.

In some embodiments, controller 102 may receive an entry signal. The entry signal may include a voice command, a proximity detection of an ignition key or key fob associated with the vehicle 10, a door open signal, a wake up signal associated with the CAN bus 26, any other suitable signal, or a combination thereof. The controller 102 may receive the entry signal from any suitable sensor of the vehicle 10. The entry signal may indicate that the operator of the vehicle 10 is attempting to enter the vehicle 10 on the side of the vehicle 10 corresponding to the handwheel of the vehicle 10. The controller 102 may analyze the entry signal and may determine that the operator is attempting to enter the vehicle 10 based on the entry signal using any suitable technique.

The controller 102 may determine whether the entry signal indicates that the operator is attempting to enter or exit the vehicle 10 based on the entry signal. For example, the entry signal may indicate that the door is open but that the vehicle 10 ignition was previously on indicating the operator is exiting the vehicle 10. If the controller 102 determines that the entry signal indicates that the operator is attempting to exit the vehicle 10, the controller 102 may selectively control the handwheel actuator 108 to hold a position of the handwheel of the vehicle 10. It should be understood that the controller 102 may receive one or more ignition signals (e.g., from a sensor associated with the ignition of the vehicle 10, from a controller or processor associated with the ignition of the vehicle 10, or other suitable source). It should further be understood that the controller 102 may receive other suitable signals, information, and/or measurements indicating, individually or in combination, that the operator is entering or exiting the vehicle 10.

Conversely, if the controller 102 determines that the entry signal indicates that the operator is attempting to enter the vehicle 10, the controller 102 identify a handwheel torque value corresponding to a torque applied on the handwheel of the vehicle 10. The handwheel torque value may correspond to an amount of torque applied to the handwheel by the operator while the operator attempts to enter the vehicle 10 (e.g., by pulling on the handwheel to assist in entry into the vehicle 10). The controller 102 may determine a counter torque value corresponding to the handwheel torque value.

For example, the controller 102 may identify a torque value that is opposite to the handwheel torque value (e.g., to resist the handwheel torque value).

The controller 102 may apply torque to the handwheel based on the counter torque value. For example, the controller 102 may selectively instruct the handwheel actuator 108 to generate torque corresponding to the counter torque value. The handwheel actuator 108 may apply the torque to the handwheel of the vehicle 10. The torque corresponding to the counter torque value may resist the handwheel torque value, which may maintain the position of the handwheel as the operator attempts to enter the vehicle 10.

The controller 102 may monitor the handwheel torque value over a period. For example, the controller 102 may wait a predetermined period. After the predetermined period expires, the controller 102 may receive the handwheel torque value. The controller 102 determines whether the handwheel torque value (e.g., which may include the handwheel torque value or a torque value substantially similar to the handwheel torque value) is applied to the handwheel after the predetermined period has expired. If the controller 102 determines that the handwheel torque value is applied to the handwheel after the expiration of the predetermined period, the controller 102 may adjust the counter torque value. For example, the controller 102 may increase the counter torque value. The controller 102 may increase the counter torque value by any suitable amount. For example, the controller 102 may determine a percentage of the handwheel torque value applied to the handwheel. The controller 102 may increase the counter torque value by the percentage (e.g., the controller 102 may increase the absolute value of the counter torque value by a greater amount for greater handwheel torque values than for lessor handwheel torque values). Alternatively, the controller 102 may decrease the counter torque value. The controller 102 may selectively instruct the handwheel actuator 108 to apply torque to the handwheel based on the adjusted counter torque value, which may overcome the handwheel torque value and assist (e.g., by pulling away from the operator) the operator in entry to the vehicle.

In some embodiments, the controller 102 may determine that the handwheel torque value has increased. For example, the controller 102 may monitor the handwheel torque value. If the controller 102 determines that the handwheel torque value has increased (e.g., any time during or after the expiration of the predetermine period), the controller 102 may selectively adjust the counter torque value. For example, the controller 102 may increase the counter torque value to be equal to or greater than the handwheel torque value. The controller 102 may then selectively control the handwheel actuator 108 based on the adjusted counter torque value.

In some embodiments, the controller 102 may determine whether the handwheel torque value is no longer being applied to the handwheel of the vehicle 10. For example, the controller 102 may receive a handwheel torque value indicating that the operator has released he handwheel. The controller 102 may selectively control the handwheel actuator 108 to hold position of the handwheel of the vehicle 10 in any suitable position.

In some embodiments, controller 102 may, in response to an entry signal indicating an opening of an operator door, detect a first torque value corresponding to a first torque applied to a handwheel. The controller 102 may determine a second torque value corresponding to the first torque value. An absolute value of the second torque value may be equal to an absolute value of the first torque value. The second torque value may be applied in a direction opposite of the first torque value.

The controller 102 may apply, to the handwheel, a second torque corresponding to the second torque value. The controller 102 may, based on at least one of a measurement associated with a seat sensor of the vehicle 10 and the predetermined period, determine whether to selectively adjust the second torque value. The seat sensor may include any suitable seat sensor. The seat sensor may be disposed in the operator seat of the vehicle 10. The seat sensor may be configured to measure a force on the operator seat. The force may indicate whether the operator is in the operator seat. For example, if the force is greater than a seat sensor threshold, the force may indicate that the operator is in the operator seat. Alternatively, if the force is less than the seat sensor threshold, the force may indicate that the operator is not or partially in the operator seat.

In some embodiments, the controller 102 may determine to selectively adjust the second torque value in response to the force measured by the seat sensor being less than the seat sensor threshold and the period associated with the first torque being applied to the handwheel being greater than the predetermined period (e.g., indicating that the operator is not in the operator seat and is still applying the first torque or substantial the first torque to the handwheel). For example, the controller 102 may increase the second torque value, such that, when applied to the handwheel actuator 108, the handwheel moves in a direction opposite the first torque to assist the operator in entry into the vehicle 10. The controller 102 may apply the second torque corresponding to the second torque value to the handwheel actuator 108.

Additionally, or alternatively, the controller 102 may determine to selectively adjust the second torque value in response to the force measured by the seat sensor being greater than the seat sensor threshold and the period associated with the first torque being applied to the handwheel being less than the predetermined period (e.g., indicate that the operator is in the operator seat and is no longer applying torque to the handwheel). For example, the controller 102 may decrease the second torque value, such that, when applied to the handwheel actuator 108, the handwheel is held in a suitable position. The controller 102 may apply the second torque corresponding to the second torque value to the handwheel actuator 108.

Additionally, or alternatively, the controller 102 may determine to selectively adjust the second torque value in response to the force measured by the seat sensor being greater than the seat sensor threshold and the period associated with the first torque being applied to the handwheel being greater than the predetermined period (e.g., indicating that the operator is in the operator seat and applying torque to the handwheel). For example, For example, the controller 102 may decrease the second torque value, such that, when applied to the handwheel actuator 108, the handwheel is held in a suitable position. The controller 102 may apply the second torque corresponding to the second torque value to the handwheel actuator 108.

In some embodiments, the controller 102 may receive an ignition signal, as described. The controller 102 may, in response to the ignition signal indicating a status of an ignition has changed from an on position to an off position and in response to the entry signal indicating an opening of the operator door (e.g., indicating that the operator is exiting the vehicle 10), detect a third torque value corresponding to a third torque being applied to the handwheel. The controller 102 may determine a fourth torque value corresponding to the third torque value. The controller 102 may apply, to the handwheel actuator 108, a fourth torque corresponding to the fourth torque value (e.g., in a direction opposite the third torque value, such that the handwheel is held in a position as the operator attempts to exit the vehicle 10).

In some embodiments, the controller 102 may determine not to selectively adjust the fourth torque value in response to the force measured by the seat sensor being greater than the seat sensor threshold and the period associated with the third torque being applied to the handwheel being greater than the predetermined period (e.g., indicating that the operator is in the operator seat and applying the third torque to the handwheel, which may indicate that the operator is having difficulty exiting the vehicle 10). The controller 102 may not adjust the fourth torque value, in order prevent the operator from being unexpectedly or undesirably moved out of the operator seat.

In some embodiments, the controller 102 may determine to selectively adjust the fourth torque value in response to the force measured by the seat sensor being greater than the seat sensor threshold and a period associated with the third torque being applied to the handwheel being greater than the predetermined period (e.g., indicating that the operator is in the operator seat and applying the third torque to the handwheel, which may indicate that the operator is having difficulty exiting the vehicle 10). The controller 102 may adjust the fourth torque value, such that, when applied to the handwheel actuator 108, the handwheel moves in a direction suitable for assisting the operator in exiting the vehicle 10 (e.g., in the same direction as the third torque value). The controller 102 may adjust the fourth torque value in a manner similar to those described with respect to the second torque value. The controller 102 may apply, to the handwheel actuator 108, an adjusted torque value corresponding to the adjusted fourth torque value. In some embodiments, prior to applying, to the handwheel actuator 108, the adjusted torque value corresponding to the adjusted fourth torque value, the controller 102 may indicate to the operator that the handwheel will assist the operator in exiting the vehicle 10. For example, the controller 102 may cause the handwheel, using the handwheel actuator 108, to actuate in a pattern indicating that the handwheel will assist the operator. Additionally, or alternatively, the controller 102 may cause an audible indication, a visual indication, other haptic or tactile indication, other suitable indication, or a combination thereof.

Additionally, or alternatively, the controller 102 may determine to selectively adjust the fourth torque value in response to the force measured by the seat sensor being less than the seat sensor threshold and the period associated with the third torque being applied to the handwheel being greater than the predetermined period (e.g., indicating that the operator is not in the operator seat and applying the third torque to the handwheel, which may indicate that the operator exited the vehicle 10). For example, For example, the controller 102 may decrease the fourth torque value, such that, when applied to the handwheel actuator 108, the handwheel is held in a suitable position. The controller 102 may apply the fourth torque corresponding to the fourth torque value to the handwheel actuator 108.

In some embodiments, the system 100 and/or the controller 102 may perform the methods described herein. However, the methods described herein as performed by the system 100 and/or the controller 102 are not meant to be limiting, and any type of software executed on a controller can perform the methods described herein without departing from the scope of this disclosure. For example, a controller, such as a processor executing software within a computing device, can perform the methods described herein.

Figure 3:
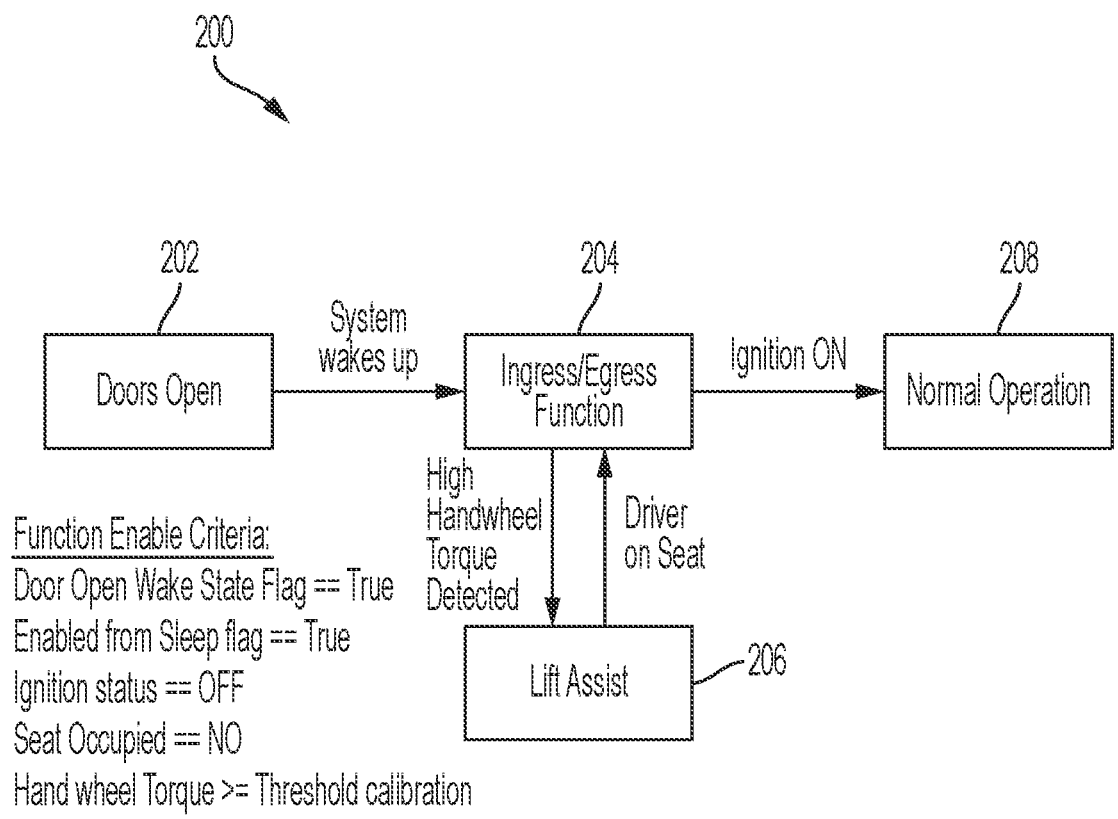
FIG. 3 is a block diagram generally illustrating a lift assist method according to the principles of the present disclosure.

FIG. 3 is a block diagram generally illustrating a lift assist method 200 according to the principles of the present disclosure. At 202, at least one door of the vehicle 10 opens. The method 200 may include waking up in response to the at least one door opening.

At 204, the method 200 may enable the ingress and/or egress function. For example, the controller 102 may begin monitoring and/or setting the status and/or value of various flags. The controller 102 may monitor or set a door open wake state flag. For example, the controller 102 may set the door open wake state flag to "True." The door open wake state flag may be set to true in response to the at least one door opening by the controller 102 or other suitable controller. The controller 102 may set an enable from sleep flag to "True" in response to the ingress and/or egress function being enabled. The controller 102 may monitor an ignition status value and a seat occupied value. Additionally, or alternatively, the controller 102 may monitor, using a sensor associated with the handwheel actuator 108, an amount of torque applied to the handwheel. The controller 102 may determine whether the amount of torque is greater than a threshold calibration amount of torque.

At 206, the method 200 may receive a high handwheel torque value. For example, the controller 102 may determine that an amount of torque applied to the handwheel is greater than the threshold calibration amount of torque (e.g., which may be referred to as a high handwheel torque). The controller 102 may apply various amounts of torque to the handwheel actuator 108 to assist the operator in entry into the vehicle 10, as described. The seat occupied value may be set to "ON," in response to the operator being in the operator seat. The controller 102 may apply torque to the handwheel actuator 108 to hold the handwheel in a suitable position, as described.

At 208, the method 200 may include detecting that the ignition status value is set to "ON," indicating that the operator has started the ignition. The controller 102 may resume normal operation (e.g., discontinuing the ingress and/or egress function) in response to the ignition status value being set to "ON."

Figure 4:
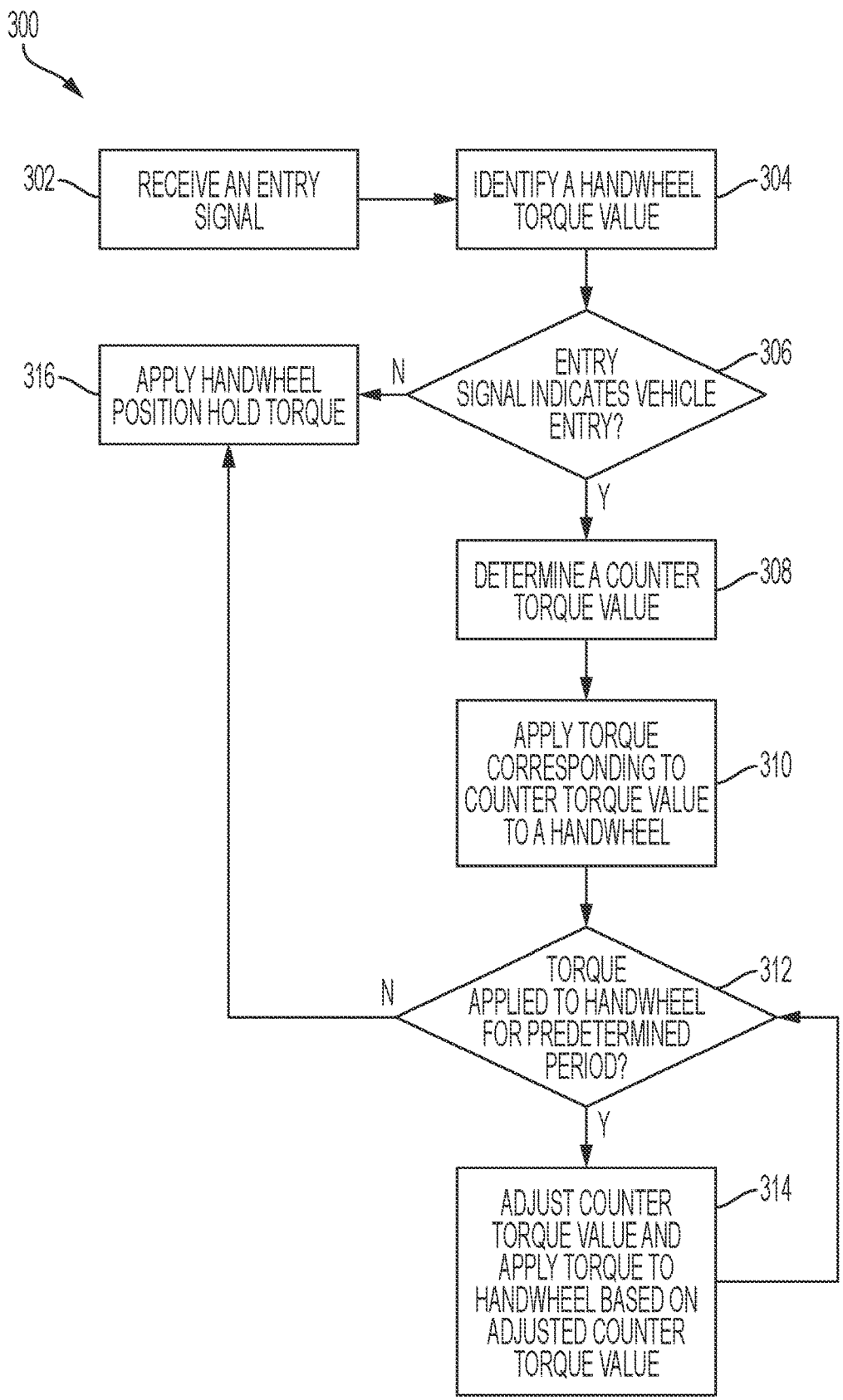
FIG. 4 is a flow diagram generally illustrating a lift assist method according to the principles of the present disclosure.

FIG. 4 is a flow diagram generally illustrating a lift assist method 300 according to the principles of the present disclosure. At 302, the method 300 receives an entry signal. For example, the controller 102 receives the entry signal.

At 304, the method 300 identifies a handwheel torque value. For example, the controller 102 identifies the handwheel torque value applied to the handwheel by the operator. The controller 102 may receive the handwheel torque value from the sensors associated with the handwheel torque actuator 108 or any suitable sensor or source.

At 306, the method 300 determines whether the entry signal indicates that the operator is attempting to enter the vehicle. For example, the controller 102 determines whether the entry signal indicates that the operator is attempting to enter the vehicle 10 on the side of the vehicle 10 associated with the handwheel. If the controller 102 determines that the entry signal does not indicate that the operator is attempting to enter the vehicle 10, the method 300 continues at 316. If the controller 102 determines that the entry signal indicates that the operator is attempting to enter the vehicle 10, the method 300 continues at 308.

At 308, the method 300 determines a counter torque value. For example, the controller 102 determines a counter torque value corresponding to an amount of torque that will oppose the handwheel torque value.

At 310, the method 300 applies torque corresponding to the counter torque value to a handwheel. For example, the controller 102 applies the torque corresponding to the counter torque value to the handwheel using the handwheel actuator 108. The torque corresponding to the counter torque value, when applied by the handwheel actuator 108, may resist the handwheel torque value, which may hold the position of the handwheel.

At 312, the method 300 determines whether the torque applied to the handwheel has been applied to the handwheel for a predetermined period. For example, the controller 102 determines whether the torque corresponding to handwheel torque value has been applied to the handwheel for the predetermined period. If the controller 102 determines that the torque corresponding to the handwheel torque has been applied to the handwheel for at least as long as the predetermined period, the method 300 continues at 314. If the controller 102 determines that the torque corresponding to the handwheel torque value has not been applied to the handwheel for at least as long as the predetermined period, the method 300 continues at 316.

At 314, the method 300 adjusts the counter torque value and applies torque to the handwheel based on the adjusted counter torque value. For example, the controller 102 may increase (e.g., or decrease) the counter torque value. The controller 102 may selectively control the handwheel actuator 108 to apply torque corresponding to the adjusted counter torque value to the handwheel of the vehicle 10. The method 300 continues at 312.

At 316, the method 300 applies a handwheel position hold torque. For example, the controller 102 may selectively controller the handwheel actuator 108, such that the handwheel actuator 108 applies torque to the handwheel to hold the handwheel position in place.

Figure 5:
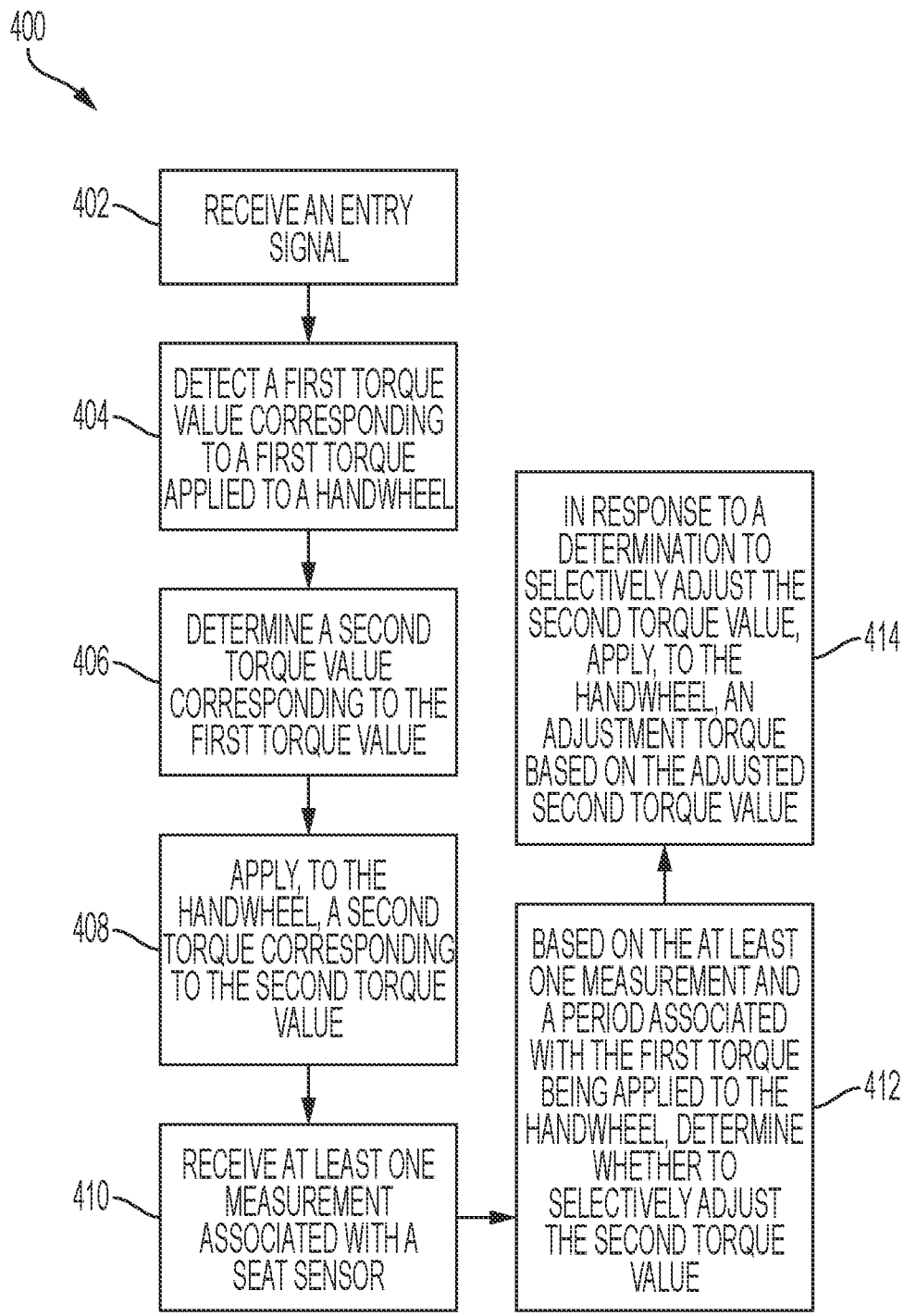
FIG. 5 is a flow diagram generally illustrating an alternative lift assist method according to the principles of the present disclosure.

FIG. 5 is a flow diagram generally illustrating an alternative lift assist method 400 according to the principles of the present disclosure. At 402, the method 400 receives an entry signal. For example, the controller 102 may receive the entry signal in response to the operator door opening.

At 404, the method 400 detects a first torque value corresponding to a first torque applied to a handwheel. For example, the controller 102 may detect, using the sensor associated with the handwheel actuator 108, the first torque value corresponding to the first torque applied to the handwheel.

At 406, the method 400 determines a second torque value corresponding to the first torque value. For example, the controller 102 may determine a second torque value corresponding to the first torque value.

At 408, the method 400 applies, to the handwheel, a second torque corresponding to the second torque value. For example, the controller 102 may apply, to the handwheel using the handwheel actuator 108, the second torque corresponding to the second torque value.

At 410, the method 400 receives at least one measurement associated with a seat sensor. For example, the controller 102 may receive at least one measurement associated with the seat sensor.

At 412, the method 400, based on at least one of a measurement associated with a seat sensor and a period associated with the first torque being applied to the handwheel, determines whether to selectively adjust the second torque value. For example, the controller 102 may, based on the at least one of the measurement associated with the seat sensor and the period associated with the first torque being applied to the handwheel, determine whether to selectively adjust the second torque value.

At 414, the method 400, in response to a determination to selectively adjust the second torque value, applies, to the handwheel, an adjusted torque corresponding to the adjusted second torque value. For example, the controller 102 may, in response to determining to selectively adjust the second torque value, apply, to the handwheel using the handwheel actuator 108, the adjusted torque corresponding to the adjusted second torque value.

In some embodiments, a system for ingress or egress assist includes a processor and a memory. The memory incudes instructions that, when executed by the processor, cause the processor to: receive an entry signal; identify a handwheel torque value corresponding to a torque applied on a handwheel; determine whether the entry signal indicates a vehicle entry; and in response to a determination that the entry signal indicates a vehicle entry: determine a counter torque value corresponding to the handwheel torque value; apply torque to the handwheel based on the counter torque value; in response to the torque corresponding to the handwheel torque value being applied to the handwheel for a predetermined period, selectively adjust the counter torque value; and apply torque to the handwheel based on the adjusted counter torque value.

In some embodiments, a method for providing ingress or egress assist includes receiving an entry signal and identifying a handwheel torque value corresponding to a torque applied on a handwheel. The method also includes determining whether the entry signal indicates a vehicle entry and in response to a determination that the entry signal indicates a vehicle entry: determining a counter torque value corresponding to the handwheel torque value; applying torque to the handwheel based on the counter torque value; in response to the torque corresponding to the handwheel torque value being applied to the handwheel for a predetermined period, selectively adjusting the counter torque value; and applying torque to the handwheel based on the adjusted counter torque value.

In some embodiments, a system for providing ingress or egress assist includes a processor and a memory. The memory includes instructions that, when executed by the processor, cause the processor to: in response to an entry signal indicating an opening of an operator door, detect a first torque value corresponding to a first torque applied to a handwheel; determine a second torque value corresponding to the first torque value; apply, to the handwheel, a second torque corresponding to the second torque value; and, based on at least one of a measurement associated with a seat sensor and a period associated with the first torque being applied to the handwheel: determine whether to selectively adjust the second torque value; and, in response to a determination to selectively adjust the second torque value, apply, to the handwheel, an adjusted torque corresponding to the adjusted second torque value.

In some embodiments, an absolute value of the second torque value is equal to an absolute value of the first torque value. In some embodiments, the second torque value is applied in a direction opposite of the first torque value. In some embodiments, adjusting the second torque value includes increasing the second torque value based on an absolute value of the first torque value. In some embodiments, the instructions further cause the processor to determine to selectively adjust the second torque value in response to the measurement associated with the seat sensor being less than a seat sensor threshold and the period associated with the first torque being applied to the handwheel being greater than a period threshold. In some embodiments, the instructions further cause the processor not to determine to selectively adjust the second torque value in response to the measurement associated with the seat sensor being greater than a seat sensor threshold and the period associated with the first torque being applied to the handwheel being less than a period threshold. In some embodiments, the instructions further cause the processor not to determine to selectively adjust the second torque value in response to the measurement associated with the seat sensor being greater than a seat sensor threshold and the period associated with the first torque being applied to the handwheel being greater than a period threshold. In some embodiments, the instructions further cause the processor to receive an ignition signal and, in response to the ignition signal indicating a status of an ignition has changed from an on position to an off position and in response to the entry signal indicating an opening of the operator door: detect a third torque value corresponding to a third torque being applied to the handwheel; determine a fourth torque value corresponding to the third torque value; and apply, to the handwheel, a fourth torque corresponding to the fourth torque value. In some embodiments, the instructions further cause the processor to determine to selectively adjust the fourth torque value in response to the measurement associated with the seat sensor being greater than a seat sensor threshold and a period associated with the third torque being applied to the handwheel being greater than a period threshold. In some embodiments, the instructions further cause the processor to apply, to the handwheel, an adjusted torque value corresponding to the adjusted fourth torque value.

In some embodiments, a method for providing ingress or egress assist includes, in response to an entry signal indicating an opening of an operator door, detecting a first torque value corresponding to a first torque applied to a handwheel and determining a second torque value corresponding to the first torque value. The method also includes applying, to the handwheel, a second torque corresponding to the second torque value and, based on at least one of a measurement associated with a seat sensor and a period associated with the first torque being applied to the handwheel: determining whether to selectively adjust the second torque value; and, in response to a determination to selectively adjust the second torque value, applying, to the handwheel, an adjusted torque corresponding to the adjusted second torque value.

In some embodiments, an absolute value of the second torque value is equal to an absolute value of the first torque value. In some embodiments, the second torque value is applied in a direction opposite of the first torque value. In some embodiments, adjusting the second torque value includes increasing the second torque value based on an absolute value of the first torque value. In some embodiments, the method also includes determining to selectively adjust the second torque value in response to the measurement associated with the seat sensor being less than a seat sensor threshold and the period associated with the first torque being applied to the handwheel being greater than a period threshold. In some embodiments, the method also includes determining to selectively adjust the second torque value in response to the measurement associated with the seat sensor being greater than a seat sensor threshold and the period associated with the first torque being applied to the handwheel being less than a period threshold. In some embodiments, the method also includes determining to selectively adjust the second torque value in response to the measurement associated with the seat sensor being greater than a seat sensor threshold and the period associated with the first torque being applied to the handwheel being greater than a period threshold. In some embodiments, the method also includes receiving an ignition signal and, in response to the ignition signal indicating a status of an ignition has changed from an on position to an off position and in response to the entry signal indicating an opening of the operator door: detecting a third torque value corresponding to a third torque being applied to the handwheel; determining a fourth torque value corresponding to the third torque value; and applying, to the handwheel, a fourth torque corresponding to the fourth torque value. In some embodiments, the method also includes determining to selectively adjust the fourth torque value in response to the measurement associated with the seat sensor being greater than a seat sensor threshold and a period associated with the third torque being applied to the handwheel being greater than a period threshold.

In some embodiments, an apparatus for providing ingress or egress assist includes a processor and a memory. The memory includes instructions that, when executed by the processor, cause the processor to: in response to an entry signal indicating an opening of an operator door, detect a first torque value corresponding to a first torque applied to a handwheel; determine a second torque value corresponding to the first torque value; apply, to the handwheel, a second torque corresponding to the second torque value; and, based on at least the first torque being applied to the handwheel for a predefined period: adjust the second torque value; and apply, to the handwheel, an adjusted torque corresponding to the adjusted second torque value.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

Having thus described the invention, what is claimed is:

1. A system for providing ingress or egress assist, the system comprising:
    a processor; and
    a memory that includes instructions that, when executed by the processor, cause the processor to:
        in response to an entry signal indicating an opening of an operator door, detect a first torque value corresponding to a first torque applied to a handwheel;
        determine a second torque value corresponding to the first torque value;
        apply, to the handwheel, a second torque corresponding to the second torque value; and
        based on at least one of a measurement associated with a seat sensor and a period associated with the first torque being applied to the handwheel:
            determine whether to selectively adjust the second torque value; and
            in response to a determination to selectively adjust the second torque value, apply, to the handwheel, an adjusted torque corresponding to the adjusted second torque value.

2. The system of claim 1, wherein an absolute value of the second torque value is equal to an absolute value of the first torque value.

3. The system of claim 1, wherein the second torque value is applied in a direction opposite of the first torque value.

4. The system of claim 1, wherein adjusting the second torque value includes increasing the second torque value based on an absolute value of the first torque value.

5. The system of claim 1, wherein the instructions further cause the processor to determine to selectively adjust the second torque value in response to the measurement associated with the seat sensor being less than a seat sensor threshold and the period associated with the first torque being applied to the handwheel being greater than a period threshold.

6. The system of claim 1, wherein the instructions further cause the processor not to determine to selectively adjust the second torque value in response to the measurement associated with the seat sensor being greater than a seat sensor threshold and the period associated with the first torque being applied to the handwheel being less than a period threshold.

7. The system of claim 1, wherein the instructions further cause the processor not to determine to selectively adjust the second torque value in response to the measurement associated with the seat sensor being greater than a seat sensor threshold and the period associated with the first torque being applied to the handwheel being greater than a period threshold.

8. The system of claim 1, wherein the instructions further cause the processor to:
    receive an ignition signal and;
    in response to the ignition signal indicating a status of an ignition has changed from an on position to an off position and in response to the entry signal indicating an opening of the operator door:
        detect a third torque value corresponding to a third torque being applied to the handwheel;
        determine a fourth torque value corresponding to the third torque value; and
        apply, to the handwheel, a fourth torque corresponding to the fourth torque value.

9. The system of claim 8, wherein the instructions further cause the processor to determine to selectively adjust the fourth torque value in response to the measurement associated with the seat sensor being greater than a seat sensor threshold and a period associated with the third torque being applied to the handwheel being greater than a period threshold.

10. The system of claim 9, wherein the instructions further cause the processor to apply, to the handwheel, an adjusted torque value corresponding to the adjusted fourth torque value.

11. A method for providing ingress or egress assist, the method comprising:
    in response to an entry signal indicating an opening of an operator door, detecting a first torque value corresponding to a first torque applied to a handwheel;
    determining a second torque value corresponding to the first torque value;
    applying, to the handwheel, a second torque corresponding to the second torque value; and
    based on at least one of a measurement associated with a seat sensor and a period associated with the first torque being applied to the handwheel:
        determining whether to selectively adjust the second torque value; and in response to a determination to selectively adjust the second torque value, applying, to the handwheel, an adjusted torque corresponding to the adjusted second torque value.

12. The method of claim 11, wherein an absolute value of the second torque value is equal to an absolute value of the first torque value.

13. The method of claim 11, wherein the second torque value is applied in a direction opposite of the first torque value.

14. The method of claim 11, wherein adjusting the second torque value includes increasing the second torque value based on an absolute value of the first torque value.

15. The method of claim 11, further comprising determining to selectively adjust the second torque value in response to the measurement associated with the seat sensor being less than a seat sensor threshold and the period associated with the first torque being applied to the handwheel being greater than a period threshold.

16. The method of claim 11, further comprising determining to selectively adjust the second torque value in response to the measurement associated with the seat sensor being greater than a seat sensor threshold and the period associated with the first torque being applied to the handwheel being less than a period threshold.

17. The method of claim 11, further comprising determining to selectively adjust the second torque value in response to the measurement associated with the seat sensor being greater than a seat sensor threshold and the period associated with the first torque being applied to the handwheel being greater than a period threshold.

18. The method of claim 11, further comprising:
receiving an ignition signal and;
in response to the ignition signal indicating a status of an ignition has changed from an on position to an off position and in response to the entry signal indicating an opening of the operator door:
  detecting a third torque value corresponding to a third torque being applied to the handwheel;
  determining a fourth torque value corresponding to the third torque value; and
  applying, to the handwheel, a fourth torque corresponding to the fourth torque value.

19. The method of claim 18, further comprising determining to selectively adjust the fourth torque value in response to the measurement associated with the seat sensor being greater than a seat sensor threshold and a period associated with the third torque being applied to the handwheel being greater than a period threshold.

20. An apparatus for providing ingress or egress assist, the apparatus comprising:
a processor; and
a memory that includes instructions that, when executed by the processor, cause the processor to:
  in response to an entry signal indicating an opening of an operator door, detect a first torque value corresponding to a first torque applied to a handwheel;
  determine a second torque value corresponding to the first torque value;
  apply, to the handwheel, a second torque corresponding to the second torque value; and
  based on at least the first torque being applied to the handwheel for a predefined period:
    adjust the second torque value; and
    apply, to the handwheel, an adjusted torque corresponding to the adjusted second torque value.

* * * * *